United States Patent [19]

Driver

[11] Patent Number: 4,752,511
[45] Date of Patent: Jun. 21, 1988

[54] METHOD AND APPARATUS FOR SEALING THE SPACE BETWEEN PIPES AND LININGS THEREFOR

[75] Inventor: F. Thomas Driver, Memphis, Tenn.

[73] Assignee: Insituform International NV, Willemstad, Netherlands Antilles

[21] Appl. No.: 896,715

[22] Filed: Aug. 15, 1986

[51] Int. Cl.⁴ .................. F16L 57/00; B29C 41/32
[52] U.S. Cl. ...................................... 428/36; 156/287;
156/294; 138/97; 138/140; 264/229; 264/269;
264/516; 264/573
[58] Field of Search .................. 428/36; 156/287, 294;
138/97, 140; 264/516, 573, 229, 269

[56] References Cited

U.S. PATENT DOCUMENTS

| | | | |
|---|---|---|---|
| 4,064,211 | 12/1977 | Wood | 156/287 |
| 4,529,008 | 7/1985 | Appleton | 138/97 |
| 4,622,196 | 11/1986 | Wood | 156/287 |
| 4,637,754 | 1/1987 | Wood | 156/287 |

Primary Examiner—Nancy Swisher
Assistant Examiner—Beth A. Bozzelli
Attorney, Agent, or Firm—James & Franklin

[57] ABSTRACT

When pipes are provided with comparatively rigid linings, the gaps which tend to appear between the pipe and the lining along the length thereof, and through which gaps gaseous type contents tend to escape, are sealed by providing between the pipe and the lining radially expandable sealing rings spaced along the length of the pipe, those rings compressing when the lining is in place and only partially expanding if the lining tends to separate from the pipe, thereby to provide a series of annular seals along the length of the pipe. The sealing rings may be positioned within the pipe before the lining is applied or may be initially secured to the lining and moved into place with the lining.

13 Claims, 2 Drawing Sheets

METHOD AND APPARATUS FOR SEALING THE SPACE BETWEEN PIPES AND LININGS THEREFOR

The present invention relates to method and apparatus for preventing escape or travel of fluid along spaces that may form between a pipe and a lining that is applied to the interior of the pipe.

Pipelines and passageways need repair or replacement as they age. Replacement, particularly of underground pipelines and passageways, is extremely costly. Accordingly it is becoming increasingly common to provide linings for such pipelines and passageways while those structures remain in place. Various types of lining have been provided, some flexible and some rigid and some flexible when applied but rigidifying after application, but in all cases it is preferable that the lining be of a nature such that it closely conforms to and engages the inner surface of the pipeline or passageway. With linings that are flexible either permanently or initially, that conformity to and engagement with the internal surface of the pipe (the term "pipe" is here used generically to include all types of pipelines or passageways) is accomplished by internally pressurizing the lining.

In one widely practiced method of lining pipes, certain aspects of which are disclosed in Wood U.S. Pat. No. 4,064,211 of Dec. 20, 1977 entitled "Lining of Passageways", flexible lining tubes are utilized. These tubes comprise a resin-absorbent material which serves to soak up a curable synthetic resin. The resin-impregnated tube, initially flexible, is inserted into the pipe and then forced radially outwardly into engagement with the internal pipe surface by internally pressurizing the flexible tube by means of pneumatic or hydraulic pressure, with or without providing a vacuum in the initial space between the tube and the pipe. After that internal pressurization, the resin with which the tube is impregnated cures, thus producing a rigid lining within the pipe which ideally closely conforms to the entire inner surface of the pipe. However, in practice it has been found that the lining, after the internal pressure is relieved, can shrink away from the pipe, creating a small annular gap, perhaps only a few millimeters wide in a pipe having a one meter diameter, that gap sometimes occurring over all or a substantial portion of the length of the lined pipe. This annular gap does not cause concern in pipes such as sewer pipes where the fluid passing through the pipe is a liquid and is at relatively low pressure, but in the case of a pressure pipe, such as a gas pipeline, the annular gap, when it forms, constitutes a serious problem in that the gas can gain access to and then travel along the axial length of that gap and escape, thus rendering the lining to a large extent ineffective.

One attempt to solve this problem has been to provide some sort of adhesive seal between the lining and the inner surface of the pipe, but this usually requires thorough cleaning of the pipe surface, which presents practical problems particularly with underground pipes, and even with cleaning when a pipe on the order of 200 meters or more long is involved it is very difficult to ensure that the seal between the lining and the pipe surface will be effective along the entire length of the pipe. Moreover, when the lining is adhesively attached to a pipe with a crack in it and the pipe subsequently shifts at the crack the adhesively secured lining tends to break, whereas when the lining is not adhesively secured it will not break under those circumstances because its distortion is spread over a significant length of the lining rather than being concentrated at the place where the shift occurs.

It is the prime object of the present invention to prevent the passage of fluid through spaces between a pipe and its lining which is effective, inexpensive and readily accomplished.

It is a further object of the present invention to accomplish the aforementioned results by means particularly well adapted for use in connection with the lining of pipes by flexible linings which are pressed into engagement with the internal pipe surface and cured, after which the pressure is released.

It is a further object of the present invention to provide an effective seal between pipes and pipe linings to prevent, for example, the tracking of gas along the annular gap between a lining which has shrunk away from the inner surface of the pipe to create an annular gap between the lining and the pipe, as well as to prevent external fluids, such as ground water, from tracking along that gap and ultimately reaching the interior of the lining.

In accordance with the present invention, sealing rings are located at spaced intervals along the length of the pipe, either prior to or during the application of the lining to the pipe. Preferably the rings comprise a resiliently deformable material so that they will compress when an initially flexible lining is used and when that lining is pressed against the inner surface of the pipe and will recover incompletely in the event of shrinkage of the lining away from the pipe, thereby to maintain a circumferential seal between the pipe and the lining, the circumferential seals produced by the plurality of axially spaced sealing rings thus preventing fluid from moving axially along the length of the pipe for any distance greater than the axial spacing between the sealing rings. Hence any fluid which enters a given annular gap will be trapped there and cannot escape. The sealing rings, which may be of a rubbery elastomeric material, are designed so that they will be compressed, when the lining is initially applied, by an amount greater than the amount which they will recover during the expected shrinkage of the lining. The rings may take any suitable cross-section, such as circular, and may be provided with sealing ribs to form a labyrinth seal which will deform more than the main body of the ring.

It will be noted that while the present invention is particularly suitable for use with initially flexible but subsequently rigidified linings such as those disclosed in U.S. Pat. No. 4,064,211, it has applicability in connection with flexible linings of other types and with substantially rigid linings which are pressed into position.

To the accomplishment of the above, and to such other objects as may hereinafter appear, the present invention relates to method and apparatus for providing seals between a pipe and a pipe lining as defined in the appended claims and as described in this specification, taken together with the accompanying drawings, in which:

FIG. 1 is a diagrammatic cross-sectional view illustrating the principle of the pipe lining disclosed in U.S. Pat. No. 4,064,211, utilizing a flexible lining which is pressed into engagement with the pipe inner surface and cured, typical sealing rings being shown in position within the pipe prior to the insertion of the lining;

Figure 1:
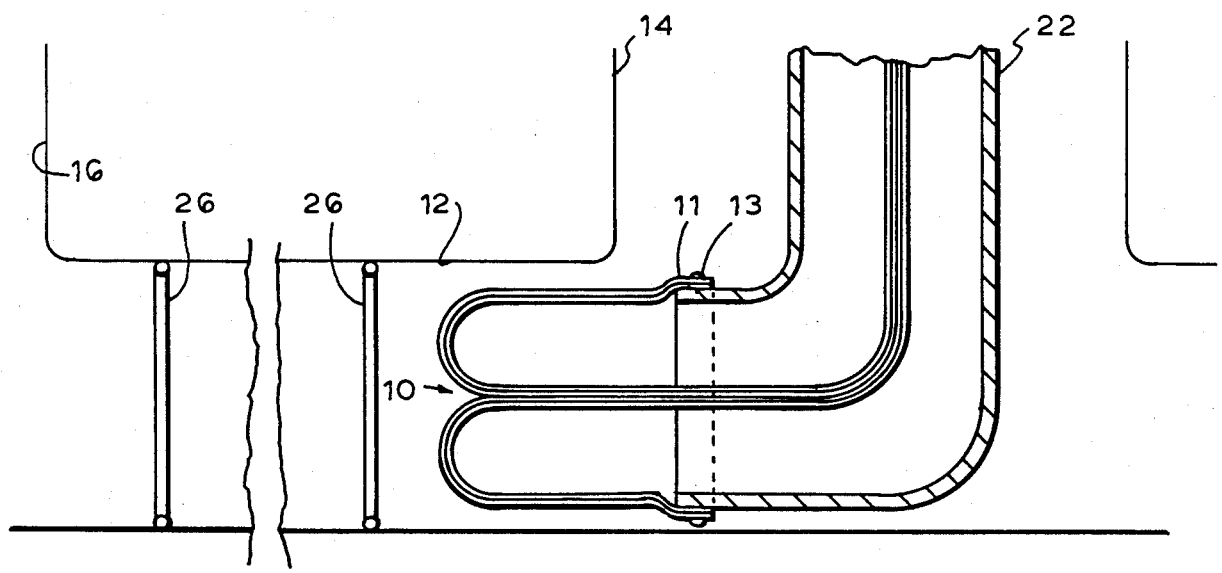
Figure 2:
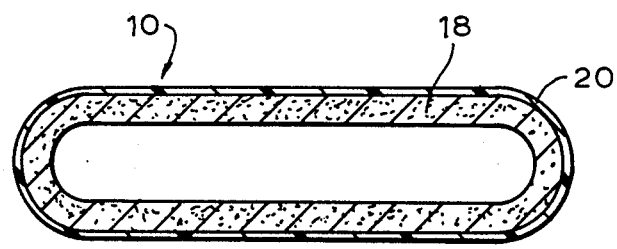
FIG. 2 is a cross-sectional view showing the flexible lining tube which is used in the method illustrated in FIG. 1.

FIG. 1 discloses diagrammatically how a lining, generally designated 10, is applied to an underground pipeline 12 between two manholes 14 and 16. The lining 10 is in the form of a tube formed of a flexible material of the construction shown basically in FIG. 2 comprising, prior to insertion in the pipeline 12, an inner felt or other resin-absorbent material 18 surrounded by a fluid-impermeable membrane 20 normally bonded to the felt layer 18 and usually constituted by a synthetic plastic film. The felt layer 18 is impregnated with a suitable curable synthetic resin which makes the lining of considerable weight while still flexible. To insert the lining 10 into the pipe 12 a leading end 11 of the lining 10 is inserted through a feed elbow 22 and the leading end 11 is turned back upon itself and fixed to the lower end of the feed elbow, as at 13. Water or other fluid is then forced into the feed elbow 22 which causes the lining tube 10 to evert into and along the interior of the pipe 12. As a result the resin-impregnated felt layer 18 becomes the outer layer while the fluid-impermeable layer 20 becomes the inner layer. The fluid which everts the lining tube 10 also exerts a radial pressure on the interior of the lining, expanding it and pressing it against the inner surface of the pipe 12. The lining is maintained in engagement with the pipe 12 until the resin which impregnates the felt layer 18 cures. That curing may be effected by any suitable means, such as through the use of heated water, induction heating, or high frequency ultrasonics. After the resin cure has been completed the fluid is removed from inside the lining 10, thus leaving a hard, rigid lining applied to the pipeline surface.

As has been indicated above, a difficulty which arises, in connection with this and other methods of pipe lining, is that the lining tends to shrink away from the inner surface of the pipe 12. This tendency is perhaps particularly marked when resin-impregnated layers are used. When that shrinkage occurs an annular gap will form between the lining and the pipe, and, particularly if the pipe carries gas, and especially gas under pressure, the gas can find its way into and along that annular gap and leak off.

In accordance with the present invention, this problem is overcome by providing sealing rings, generally designated 26, between the lining 10 and the pipe 12, those rings 26 being spaced at intervals along the length of the pipe. There is nothing particularly critical about the axial spacing between adjacent sealing rings 26, and that spacing will vary widely from installation to installation, depending upon the nature of the fluid carried by the pipe, the condition of the pipe, the distance between manholes or other transverse connections when the pipe is underground, the degree to which the fluid can be expected to penetrate the lining, and the like. Typically, however, they will be located on opposite sides of joints in the pipe connecting the pipe, for example, with branch pipes, because such joints are particularly susceptible to fluid leakage therethrough.

Figure 3:
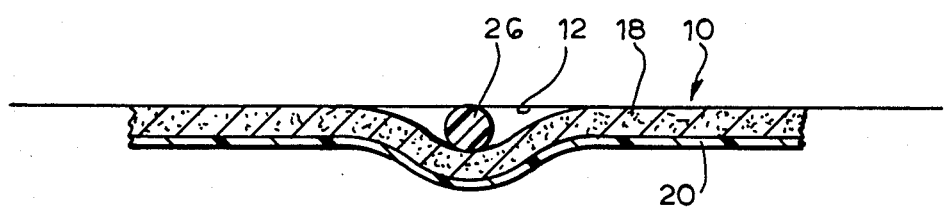
FIG. 3 is a cross-sectional view illustrating the relationship between the lining, the pipe inner surface and a sealing ring before internal pressure is applied to the lining.
Figure 3A:
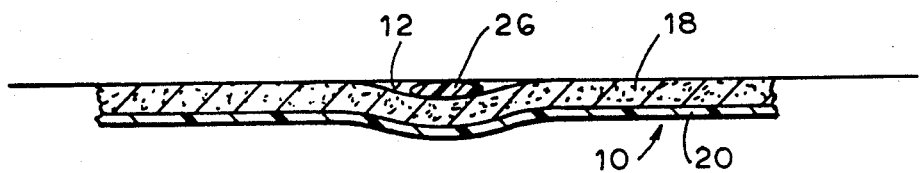
FIG. 3A is a view similar to FIG. 3 but showing the relationship of the parts after pressure has been applied inside the lining so as to force the lining against the inner surface of the pipe.
Figure 4:
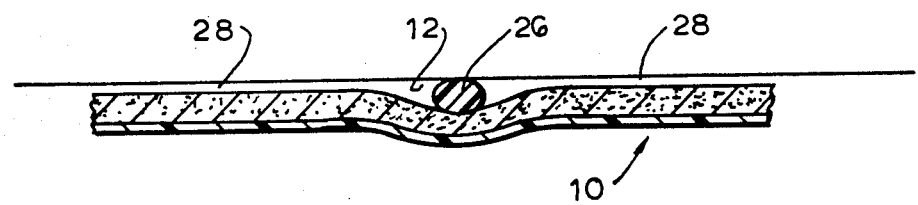
FIG. 4 is a view similar to FIG. 3A but showing the relationship of the parts after the lining has solidified and has shrunk slightly away from the pipe inner surface.

One typical sealing ring 26 is shown in FIGS. 3, 3A and 4. It comprises a ring of resilient material of circular cross-section. Natural or synthetic rubber or comparable plastics are suitable for use, with the particular material employed being selected in the light of the conditions to which it will be subjected and the substances to which it will be exposed in use. As shown in FIG. 1, the sealing rings are placed in position inside the pipe 12 prior to the insertion and cure of the lining 10. Hence, as diagrammatically illustrated in FIG. 3, when the lining 10 is initially inserted the sealing ring 26 will be interposed between the felt layer 18 and the pipe 12, and as pressure is applied inside the lining 10 to force it against the inner surface of the pipe the sealing ring 26 will, as diagrammatically illustrated in FIG. 3A, become compressed to a substantial degree.

After the resin in the layer 18 has cured, and if the lining 10 then tends to shrink and separate somewhat from the inner surface of the pipe 12, FIG. 4 diagrammatically indicates the relationship of the parts. The shrinkage of the lining 10 from the pipe 12 has produced an annular gap 28 between the lining 10 and the pipe 12, and the sealing ring 26 will have expanded somewhat from its extremely compressed condition shown in FIG. 3A, but the ring 26 will still be compressed compared to its normal condition shown in FIG. 3. Thus each sealing ring 26 provides a circumferential seal between the lining 10 and the pipe 12, so that any fluid which may make its way into a given annular gap 28 cannot travel along the length of the pipe 12, but will be confined between a pair of adjacent sealing rings 26.

Figures 5, 6, 7:
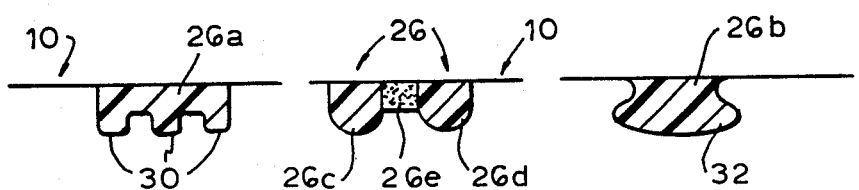
FIGS. 5, 6 and 7 are cross-sectional views of alternative sealing rings.

FIGS. 5 and 6 illustrate typical alternative cross-sectional shapes for sealing rings 26a and 26b respectively. The ring 26a has ribs 30 which may preferably define a labyrinth over the radially inner surface of the ring. The ring 26b has a pre-flattened section 32 which provides a wide sealing surface engagement. Where even wider lining-pipe sealing surfaces are desired, and as illustrated in FIG. 7, the sealing ring 26 may be defined by two adjacent ring elements 26c and 26d spaced from one another by a small distance, for example one-half inch, with the space between them being filled by a grout or other mastic material 26e, so that when the sealing ring assembly 26 is pressed against the inner surface of the pipe the ring elements 26c and 26d will compress until the grout or other mastic material 26e firmly engages the inner surface of the pipe, thus producing a sealing engagement over a greater area than is feasible with a single sealing ring 26.

Figure 8:
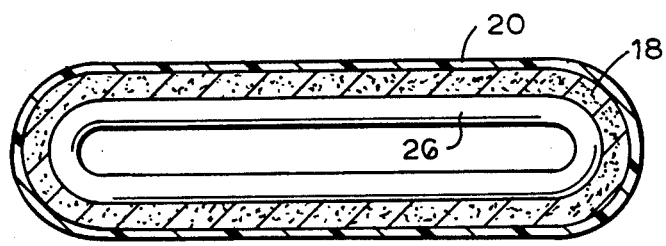
FIG. 8 is a view similar to FIG. 2 but with respect to a lining into which the sealing rings are incorporated before the lining is applied.
Figure 9:
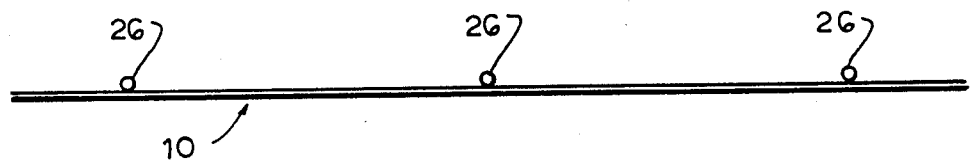
FIG. 9 is a diagrammatic side elevational view of a length of the lining of FIG. 7.

It is not necessary that the sealing rings 26 be positioned within the pipe 12 before the lining 10 is inserted. The sealing rings 26 may be made a part of the lining tube 10 before that tube is inserted, the sealing rings 26 then moving into position along the length of the pipe 12 as the tube 10 is inserted. To that end the rings 26 may be adhesively secured to the original inner tube surface of the impregnated felt layer 18, as illustrated in FIGS. 7 and 8.

While but a limited number of embodiments of the present invention have been here disclosed, it will be apparent that many variations may be made therein, all without departing from the spirit of the invention as defined in the following claims.

I claim:

1. In combination, a given length of pipe, a lining in said pipe extending therein for substantially said length, and a sealing ring of elastomeric material capable of becoming compressed when pressure is applied thereto and of expanding when at least some of said pressure is released compressed between and sealingly engaging said pipe and said lining, whereby an annular gap between said pipe and said lining is axially interrupted.

2. The combination of claim 1, in which said lining is rigid.

3. The combination of either of claims 1 or 2, in which said ring is located at a point intermediate the length of said pipe.

4. The combination of either of claims 1 or 2, in which a plurality of said rings are spaced from one another along said length.

5. The combination of either of claims 1 or 2, in which said ring has a cross-section with a generally arcuate outer surface.

6. The combination of either of claims 1 or 2, in which said ring has a cross-section provided with outwardly-extended ribs which engage at least one of said pipe and said lining.

7. The combination of either of claims 1 or 2, in which said ring comprises two ring elements slightly spaced from one another along the length of the lining, and in which a mastic material is received between said ring elements, said mastic material sealingly engaging said pipe between said sealing ring elements when said elements sealingly engage said pipe.

8. A lining for a pipe, said lining comprising a generally tubular body of extended length designed to be inserted into a pipe for lining purposes, said body carrying, spaced along the length thereof, a plurality of sealing rings of elastomeric material capable of becoming compressed when pressure is applied thereto and of expanding when at least some of said pressure is released, said rings extending around said body substantially at right angles to the length thereof and extending radially from said body.

9. The method of lining a given length of pipe which comprises:

(a) locating a sealing ring of elastomeric material capable of becoming compressed when pressure is applied thereto and of expanding when at least some of said pressure is released inside said pipe so as to extend around the interior of said pipe substantially at right angles to the length thereof;

(b) positioning a flexible liner inside said pipe length and inside said sealing ring;

(c) expanding said liner toward the interior wall of said pipe length, thereby compressing said sealing ring between itself and said pipe interior; and (d) causing said flexible liner to become more rigid, whereby, if said liner moves radially away from said pipe in the vicinity of said sealing ring, said sealing ring will expand while maintaining a seal between said pipe and said liner so as to axially interrupt any annular gap between said pipe and the said liner.

10. The method of claim 9, in which step (a) comprises locating a plurality of said sealing rings within said pipe spaced from one another along the length of said pipe.

11. The method of either of claims 9 or 10, in which step (a) is carried out before step (b) is carried out.

12. The method of either of claims 9 or 10, in which steps (a) and (b) are carried out substantially simultaneously.

13. The method of either of claims 9 or 10, in which steps (a) and (b) are carried out substantially simultaneously by pre-positioning said sealing rings on said liner before said liner is positioned inside said pipe.

* * * * *